(12) United States Patent
Liao et al.

(10) Patent No.: US 12,648,510 B2
(45) Date of Patent: Jun. 9, 2026

(54) PLANTER SUITABLE FOR BLOCK SEEDS

(71) Applicant: XIHUA UNIVERSITY, Chengdu (CN)

(72) Inventors: Min Liao, Chengdu (CN); Chao Su, Chengdu (CN); Jie Yang, Chengdu (CN); Rui Chen, Chengdu (CN); Yu Zhang, Chengdu (CN); Xiuyin Li, Chengdu (CN); Xiaofeng Gan, Chengdu (CN); Ruhu Deng, Chengdu (CN); Hu Yang, Chengdu (CN); Junju Li, Chengdu (CN); Hailong Xia, Chengdu (CN); Jiarui Wang, Chengdu (CN)

(73) Assignee: XIHUA UNIVERSITY, Chengdu (CN)

( * ) Notice: Subject to any disclaimer, the term of this patent is extended or adjusted under 35 U.S.C. 154(b) by 425 days.

(21) Appl. No.: 18/555,533

(22) PCT Filed: Dec. 28, 2022

(86) PCT No.: PCT/CN2022/142896
§ 371 (c)(1),
(2) Date: Oct. 15, 2023

(87) PCT Pub. No.: WO2024/119556
PCT Pub. Date: Jun. 13, 2024

(65) Prior Publication Data
US 2024/0423118 A1      Dec. 26, 2024

(30) Foreign Application Priority Data
Dec. 7, 2022    (CN) .......................... 202211566448.0

(51) Int. Cl.
| | |
|---|---|
| *A01C 9/08* | (2006.01) |
| *A01B 49/06* | (2006.01) |
| *A01C 15/00* | (2006.01) |

(52) U.S. Cl.
CPC ................ *A01C 9/08* (2013.01); *A01B 49/06* (2013.01); *A01C 15/005* (2013.01)

(58) Field of Classification Search
CPC .... A01C 9/00; A01C 9/02; A01C 9/04; A01C 9/06; A01C 9/08; A01C 15/005; A01B 49/06
See application file for complete search history.

(56) References Cited

U.S. PATENT DOCUMENTS

| | | | | |
|---|---|---|---|---|
| 3,701,327 A | * | 10/1972 | Krumholz | ............. A01C 7/006 111/140 |
| 4,221,305 A | * | 9/1980 | Freeman | .................. A01C 9/02 221/241 |

(Continued)

FOREIGN PATENT DOCUMENTS

| | | |
|---|---|---|
| CN | 201797728 U | 4/2011 |
| CN | 104704953 A | 6/2015 |

(Continued)

OTHER PUBLICATIONS

International Search Report dated Dec. 12, 2022; International Application No. PCT/CN2022/142896; International Filing Date Dec. 28, 2022; 3 pages; China National Intellectual Property Administration (ISA/CN), Beijing, China.

(Continued)

*Primary Examiner* — Jamie L McGowan
(74) *Attorney, Agent, or Firm* — Central California IP Group, P.C.; Andrew D. Fortney

(57) ABSTRACT

A planter suitable for block seeds that relates to agricultural seeding machinery includes a frame, a fertilizing tank, a fertilizing box, a seeding mechanism, a control mechanism, a seed box, a ridging mechanism, land wheels, a seeding furrower, a fertilizing furrower, a seed-clearing mechanism, and a replanting mechanism. The fertilizing furrower, the fertilizing tank, the fertilizing box, the seeding furrower, the (Continued)

land wheels, the seeding mechanism, the control mechanism, the seed box, and the ridging mechanism are mounted in turn from one end to an opposite end of the frame. A photoelectric sensor of an active infrared intrusion detector is adopted to dynamically monitor the presence of seed potatoes on a seed-discharge spoon in a conveying process. Seeds are replanted with the control mechanism when the seeds are sowed with an empty spoon.

13 Claims, 4 Drawing Sheets

(56) References Cited

U.S. PATENT DOCUMENTS

| | | | | | |
|---|---|---|---|---|---|
| 4,243,154 | A | * | 1/1981 | Freeman | A01C 9/02 |
| | | | | | 221/253 |
| 4,264,023 | A | * | 4/1981 | Stocks | A01C 7/123 |
| | | | | | 111/178 |
| 5,402,741 | A | * | 4/1995 | Truax | A01C 7/04 |
| | | | | | 111/172 |
| 6,244,201 | B1 | * | 6/2001 | Mauch | A01C 9/02 |
| | | | | | 111/172 |
| 8,001,913 | B2 | * | 8/2011 | Snipes | A01C 9/02 |
| | | | | | 111/171 |
| 9,769,979 | B2 | * | 9/2017 | McCloskey | A01C 5/062 |
| 10,165,724 | B2 | * | 1/2019 | Nilson | A01C 9/08 |
| 2006/0283363 | A1 | * | 12/2006 | Wollman | A01C 9/02 |
| | | | | | 111/15 |
| 2022/0132727 | A1 | * | 5/2022 | Wulferding | A01C 9/02 |
| | | | | | 111/104 |

FOREIGN PATENT DOCUMENTS

| | | | |
|---|---|---|---|
| CN | 108174661 | A | 6/2018 |
| CN | 111771442 | A | 10/2020 |
| CN | 112154750 | A | 1/2021 |

OTHER PUBLICATIONS

Written Opinion dated Jul. 13, 2023; International Application No. PCT/CN2022/142896; International Filing Date Dec. 28, 2022; 3 pages; China National Intellectual Property Administration (ISA/CN), Beijing, China.

* cited by examiner

PLANTER SUITABLE FOR BLOCK SEEDS

CROSS-REFERENCE TO RELATED APPLICATIONS

This application is a national phase application of International Pat. Appl. No. PCT/CN2022/142896, filed on Dec. 28, 2022, which claims the benefit of Chinese Pat. Appl. No. 202211566448.0, filed on Dec. 7, 2022, both of which are incorporated herein by reference as if fully set forth herein.

TECHNICAL FIELD

The present invention relates to the technical field of agricultural seeding machinery, and in particular, to a planter suitable for block seeds.

BACKGROUND

When crop is planted, block seeds are often used. The block seeds have irregular shapes. Compared with regular seeds, it is more difficult for the block seeds to achieve precision seeding. Taking potato seeds as an example, cut potatoes are usually used as seed potatoes. Potato planting technology and equipment in the prior art have prominent problems of replantation and missing seeds. Seeds need to be manually assisted to perform seed-clearing and replantation. There is less existing anti-replanting technology research and practical application. A vibration motor is generally used for seed-clearing. The presence of the seed potatoes and the number of seed potatoes on a seed-discharge spoon are random. A seed-clearing process is not controllable. A seed-clearing effect is unreliable. The seed-discharge spoon is also improved to reduce replantation, which does not have an obvious effect for cut seed potatoes. The existing technology for reduce missing seeds is mainly to use a single-shot infrared photoelectric sensor to detect the presence of the seed potatoes in the seed-discharge spoon, and then use a replanting device to replant the seeds, for technology for detecting the missing seeds, as the surface of the seed potato is adhered to a layer of power after the seed potato is cut into blocks, sterilized and sprouted, the reflective performance of the seed potato is not good. The single-shot infrared photoelectric sensor may not be able to receive a reflection signal of the cut seed potato to produce misdetection. For replanting technology, the existing technology has a replanting method which the seed potatoes slide and fall between seed spoons by relying on the self-weight of the seed potatoes, it is difficult to accurately control the replantation of the seed potatoes. Replantation is delayed and easily causes blockage, which affects a normal seeding operation. Even if a structure similar to a seeding mechanism is used as a replanting device, the replanting device also has missing seeds, which also leads to replanting failure and also increase the size of a planting machine. The structure of the planting machine also becomes complex. It can be seen that the precision seeding of block seed potatoes is still an urgent problem to be solved in the potato seeding.

An anti-missing seed potato planter with patent number No. ZL2018101989211 has the following technical problems:

(1) A replanting assembly does not have seed-potato replenishing technology. Once seed potatoes in the replanting assembly are used up, if the seed potatoes are not added in time, this leads to missing seeds. It needs to replant seeds frequently, which has lower degree of automation, and cannot realize automatic replantation and continuous seeding.

(2) A replanting action has a long time and replantation is difficult. Accurate replantation cannot be realized. The seed potatoes on a turnable slide into a seed-discharge device along a slide passage under the action of gravity. However, a chain of the seed-discharge device runs at a slower speed (0.6 m/s-0.8 m/s). There is a very short spacing between adjacent seed-discharge spoons (16 cm or so), resulting in a very short time for replantation. The seed potatoes are replanted only under the action of gravity, which has longer sliding time. Replanting the seed potatoes may have different movement time each time due to different shapes of the seed potatoes. Therefore, it is difficult to replant among the seed-discharge spoons in time. Further, it is easy to cause blockage, which affects a normal seeding operation.

(3) It lacks of a seed-clearing mechanism and reseeding problems is unresolved. In the process of taking the seed-discharge spoon from the seed box, there is a lack of a potato seed-clearing mechanism. One seed-discharge spoon is easy to take more than one potato seed, resulting in replantation.

(4) Missing seeding detection is prone to misdetection and omission. Missing seeding detection uses two single-shot infrared photoelectric sensors mounted side by side. After the seed potato is cut into blocks, disinfected and sprouted, the surface of the seed potato is adhered with a layer of powder. The reflective performance of the seed potato is not good. The single-shot infrared photoelectric sensors may not be able to receive a reflective signal of the potato seeds, resulting in misdetection. The attitude of the seed potato is also difficult to control. When small seed potatoes lie on the bottom of the seed-discharge spoon, there may be a case that a sensor does not detect the potatoes, resulting in missing detection.

The patent No. ZL2020110888378 for a potato intelligent replanter with functions of missing seed detection and replantation, there are the following drawbacks:

(1) A vibration mode with a motor does not have a good seed-clearing effect. The seed potatoes in a seed-discharge chain spoon may be vibrated out or not vibrated out, i.e., the presence of the seed potatoes on the seed-discharge chain spoon and the number of the seed potatoes are random. The seed-clearing process is not controllable. The seed-clearing effect is unreliable, resulting in the problems of missing seeds and reseeding.

(2) To detect the missing seeds of the potatoes, a single infrared photoelectric sensor is used to emit infrared light and receive an infrared reflection signal. The seed potato has an irregular shape and is usually sterilized and sprouted. The surface of the seed potato is adhered with a layer of powder, which has a poor reflective effect on light, and is likely to lead to the failure of infrared sensors to receive the signals, resulting in a misjudgment;

(3) The replanting device and the seed-discharge device are structurally similar. Since there is a missing seed case when the seed-discharge device takes the seeds, the replanting device also has the missing seed case, which also leads to the failure of replantation. On the basis of an existing seed-discharge device of the potatoes, the replanting device with a similar structure is increased. The seed potatoes in a replanting box also need to manually be added. A structure is repeated and complex. The number of machine structures is increased. The size of the machine structure becomes large, which is not suitable for use in a small field of a hilly mountainous zone.

Comprehensively, the prior art has the following technical problems: The existing planting machine has poor seed-clearing and replanting effects. It is easy to produce the phenomena of reseeding and missing seeds. For this reason, a planter suitable for block seeds is designed and used for to provide another technical solution for the above technical problems.

SUMMARY

An objective of the present invention is to provide a planter suitable for block seeds, generally to address the technical problems: the existing planting machine has poor seed-clearing and replanting effects, and are prone to reseeding and missing seeds when in use.

In order to solve the technical problems mentioned above, the present invention adopts the following technical solution:

A planter suitable for block seeds includes a frame, a fertilizing tank, a fertilizing box, a seeding mechanism, a control mechanism, a seed box, a ridging mechanism, land wheels, a seeding furrower, a fertilizing furrower, a seed-clearing mechanism, and a replanting mechanism. The fertilizing tank, the fertilizing furrower, the fertilizing box, the seeding furrower, the seeding mechanism, the land wheels, the control mechanism, the seed box, and the ridging mechanism are mounted in turn from one end to the other end of the frame. The fertilizing box is located at the top of the fertilizing tank. The fertilizing furrower is located below the fertilizing tank. The two seeding mechanisms and the two seeding furrowers are disclosed. The seeding furrower is located at the bottom end of the seeding mechanism. The seed box is located behind the seeding mechanism. The ridging mechanism is located behind the seeding furrower.

The two groups of seed-clearing mechanisms and the two groups of replanting mechanism are disclosed, and provided one side of the corresponding seeding mechanism, respectively. The seed-clearing mechanism is communicated with the seeding mechanism at the upper end. The seed-clearing mechanism is communicated with the seed box at the lower end. The middle of the seed-clearing mechanism is communicated with the upper end of the replanting mechanism. An outlet of the lower end of the replanting mechanism is communicated with an outlet of the lower end of the seeding mechanism.

The control mechanism is located at one end of the seed box. The control mechanism is connected to the replanting mechanism. The two land wheels are disclosed. The two land wheels are located on each side of the frame, respectively.

Preferably, the bottom end of the fertilizing tank is opened and provided with a fertilizing outlet. The top end of the fertilizing tank is opened and provided with a fertilizing inlet. The fertilizing outlet at the bottom end of the fertilizing tank is aligned with the fertilizing inlet at the top end of the fertilizing tank. The bottom end of the fertilizing tank is opened and provided with a discharge outlet. The discharge outlet at the bottom end of the fertilizing tank is located at the inner side of the fertilizing furrower.

Preferably, the seeding mechanism includes a seed-discharge spoon, a tensioning assembly, a driving shaft, a first driven shaft, a housing, a second driven shaft, and the seed-discharge chain.

The housing is provided thereon with the driving shaft, the first driven shaft, and the second driven shaft. The driving shaft and the first driven shaft are located at the left and right sides of the top of the housing. A driving sprocket is mounted on the driving shaft. A first driven sprocket is mounted on the first driven shaft.

The second driven shaft is located at the bottom end of the housing. A second driven sprocket is mounted on the second driven shaft. The driving sprocket, the first driven sprocket, and the second driven sprocket are connected to each other via the seed-discharge chain.

The two tensioning assemblies are disclosed and provided on the two sides of the housing, respectively. The movable end of the tensioning assembly is fixedly connected to the driving shaft. The seed-discharge spoons are mounted uniformly on an outer side of the seed-discharge chain.

Preferably, the housing is provided with a seed-clearing zone at the top end. The seed-clearing zone includes a zone between the driving shaft and a first driven shaft.

Preferably, the housing is provided with a seeding port at the bottom end. The seeding port is located below the second driven shaft and behind the seeding furrower.

Preferably, the inner part of the top end of the seed-discharge spoon is opened and provided with a seed-picking groove. The seed-picking groove has an internal volume larger than that of a base groove. A seed-clearing crossbeam is fixed at one end of the base groove. The bottom of the base groove and the bottom of the seed-picking groove are both provided with through holes. One end of the base groove is opened and provided with a connecting hole. The inner part of the connecting hole is provided with a bolt. The seed-discharge spoon is cooperatively connected to the seed-discharge chain via the bolt and the connecting hole.

Preferably, the seed-clearing mechanism includes a first seed-clearing plate, a second seed-clearing plate, a first side plate, a second side plate, and a seed-return tube. The second seed-clearing plate is fixed at one end of the first seed-clearing plate. The first seed-clearing plate is obliquely connected to the second seed-clearing plate. The second side plate is fixed at the other end of the first seed-clearing plate. The first side plate is fixed at the top of the second seed-clearing plate. The first seed-clearing plate, the second seed-clearing plate, the first side plate, and the second side plate are connected to each other to form a funnel with the big top and the small bottom. The second seed-clearing plate is fixed to the housing. The top end of the funnel is located in the inner part of the seed-clearing zone. The bottom end of the funnel is connected to the seed-return tube. The bottom end of the seed-return tube is communicated with the seed box. The seed-return tube is provided with a replanting outlet at the lower side of the middle.

Preferably, the replanting mechanism includes a first push rod, a push plate, a first sensor, a second sensor, a sensor mounting plate, a third sensor, a replanting tube, a second push rod and a baffle plate. The replanting tube is fixed to the housing. The top end of the replanting tube is communicated with the replanting outlet of the seed-return tube.

Preferably, a first connecting bracket is fixed on one side of the housing. The first push rod is fixed on the first connecting bracket. The push plate is fixed at a push rod of the first push rod. One end of the push plate runes through the replanting tube and slidingly connected to the replanting outlet of the seed-return tube. The second connecting bracket is fixed on one side of the housing. The second pushing rod is fixed on the second connecting bracket. A baffle plate is fixed at the push rod of the second push rod. The baffle plate is fixed at the push rod of the second push rod. The baffle plate is located between an outlet at a bottom end of the replanting tube and the housing.

The two sides of the top of the replanting tube are opened and provided with a first mounting hole. The first sensor is fixed inside the first mounting hole. A sensor mounting plate is fixed on the two sides of the housing. A second mounting plate is provided therein with a sensor mounting hole. The position of the housing corresponding to the second mounting hole is opened and provided with a detecting hole. The second sensor and the third sensor are mounted inside the two the second mounting holes, respectively.

Preferably, the control mechanism includes a microcontroller, a step-down module, an opto-coupler converter, and a driver module.

The step-down module is configured to adjust the voltage of an external power supply to supply power to the microcontroller.

The opto-coupler converter converts signals detected by the first sensor, the second sensor, and the third sensor into signals acceptable to the microcontroller.

The microcontroller is connected to the driver module and transmits control signals to the driver module.

The driver module is connected to and controls a seed-storage first push rod and the second push rod respectively to perform corresponding actions.

It may be seen without any doubt that the technical problems to be solved by the present application may certainly be solved by the above technical solutions of the present application.

In addition, with the above technical solution, the present invention has at least the following beneficial effects:

In the present invention, a seed-discharge spoon structure with a big tank and a small tank is adopted. The movement arrangement of the right and left section of a seed-discharge chain is combined. Self-clearing technology during a seed-discharge process of block seed potatoes is realized. A photoelectric sensor of an active infrared intrusion detector is adopted to dynamically monitor the presence of the seed potatoes on a seed-discharge spoon in a conveying process. Seeds are replanted with the control mechanism when the seeds are sowed with an empty spoon. The seeds are replanted in a seed furrow in a timely manner to avoid missing replantation, blocking and other replanting failures. The excess seed potatoes generated during a seed-clearing process are utilized to replant the seeds, which solves the problems of re-seeding and missing seeds of the block seeds. The replanting box does not need to be separately provided. The excess seed potatoes are automatically returned to the seed box. The planter has the advantages of the integration of detection, storing seeds and replantation, a simple structure, and small space occupation, and solves the problem of reseeding and missing seeds of the block seeds.

BRIEF DESCRIPTION OF THE DRAWINGS

In order to describe the technical solutions of embodiments in the present invention more clearly, the following briefly introduces the drawings that need to be used in the embodiments. Obviously, the drawings in the following description are some of embodiments of the present invention. The person skilled in the art can obtain other drawings based on these drawings without creative labor.

In the figures: 1, frame; 2, fertilizing tank; 3, fertilizing box; 4, seeding mechanism; 401, seed-discharge spoon; 4011, seed-picking groove; 4012, base groove; 4013, seed-clearing crossbeam; 402, tensioning assembly; 403, driving shaft; 404, first driven shaft; 405, housing; 406, second driven shaft; 407, seed-discharge chain; 408, seed-clearing zone; 409, seeding port; 4101, first seed-clearing plate; 4102, second seed-clearing plate; 4103, first side plate; 4104, second side plate; 4105, seed-return tube; 4131, first push rod; 4132, push plate; 4133, first sensor; 4134, second sensor; 4135, sensor mounting plate; 4136, third sensor; 4137, replanting tube; 4138, second push rod; 4139, baffle plate; 5, control mechanism; 6, seed box; 7, ridging mechanism; 8, land wheels; 9, seeding furrower; 10, fertilizing furrower.

DETAILED DESCRIPTION

In order to make the objectives, technical solutions and advantages of the present invention clearer, the following further describes the present invention in detail with reference to the accompanying drawings and embodiments. It should be understood that the specific embodiments described herein are only used to explain the present invention, but not to limit the present invention.

Figure 1:
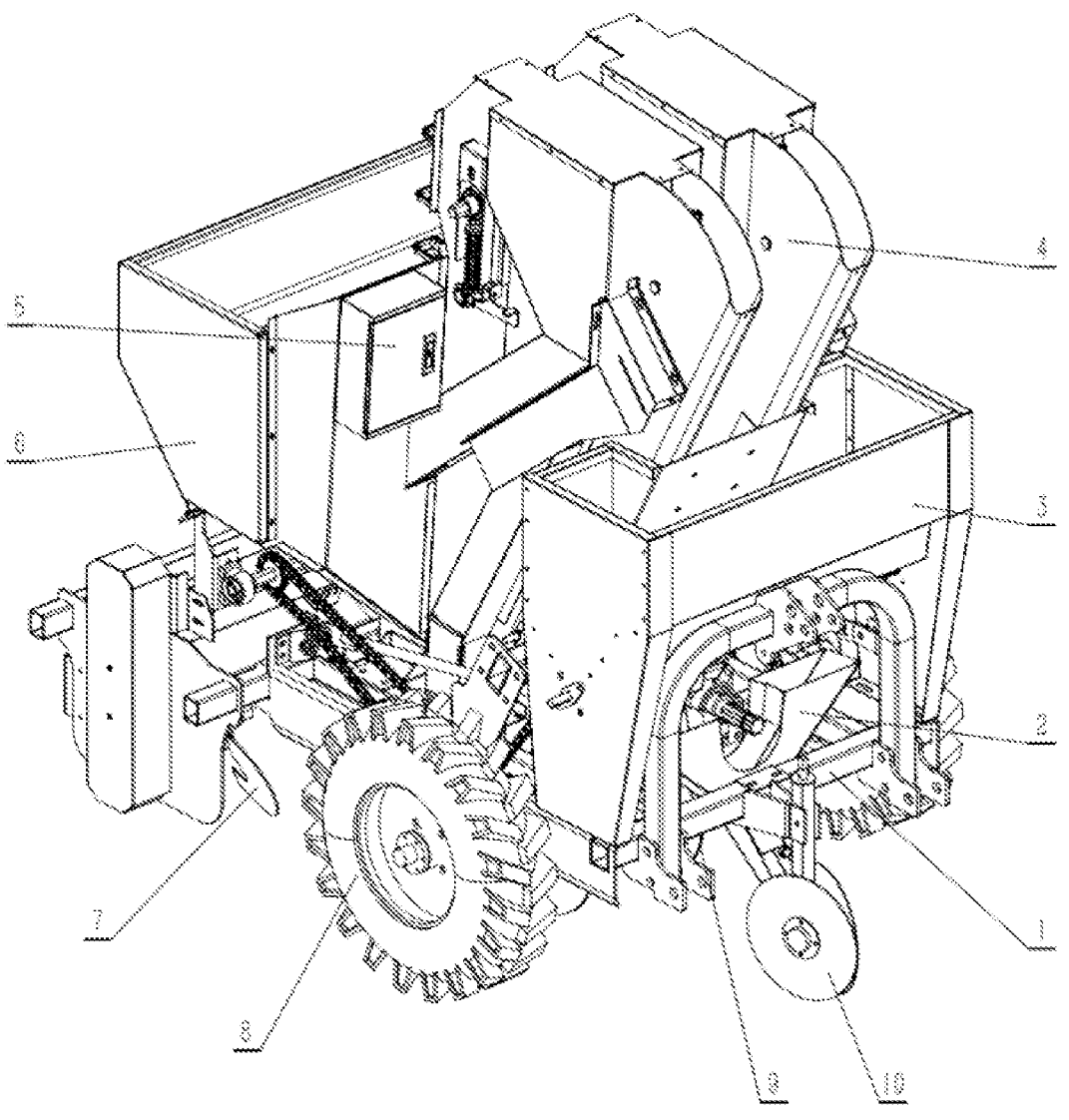
FIG. 1 is a schematic diagram of an overall structure of the present invention.
Figure 2:
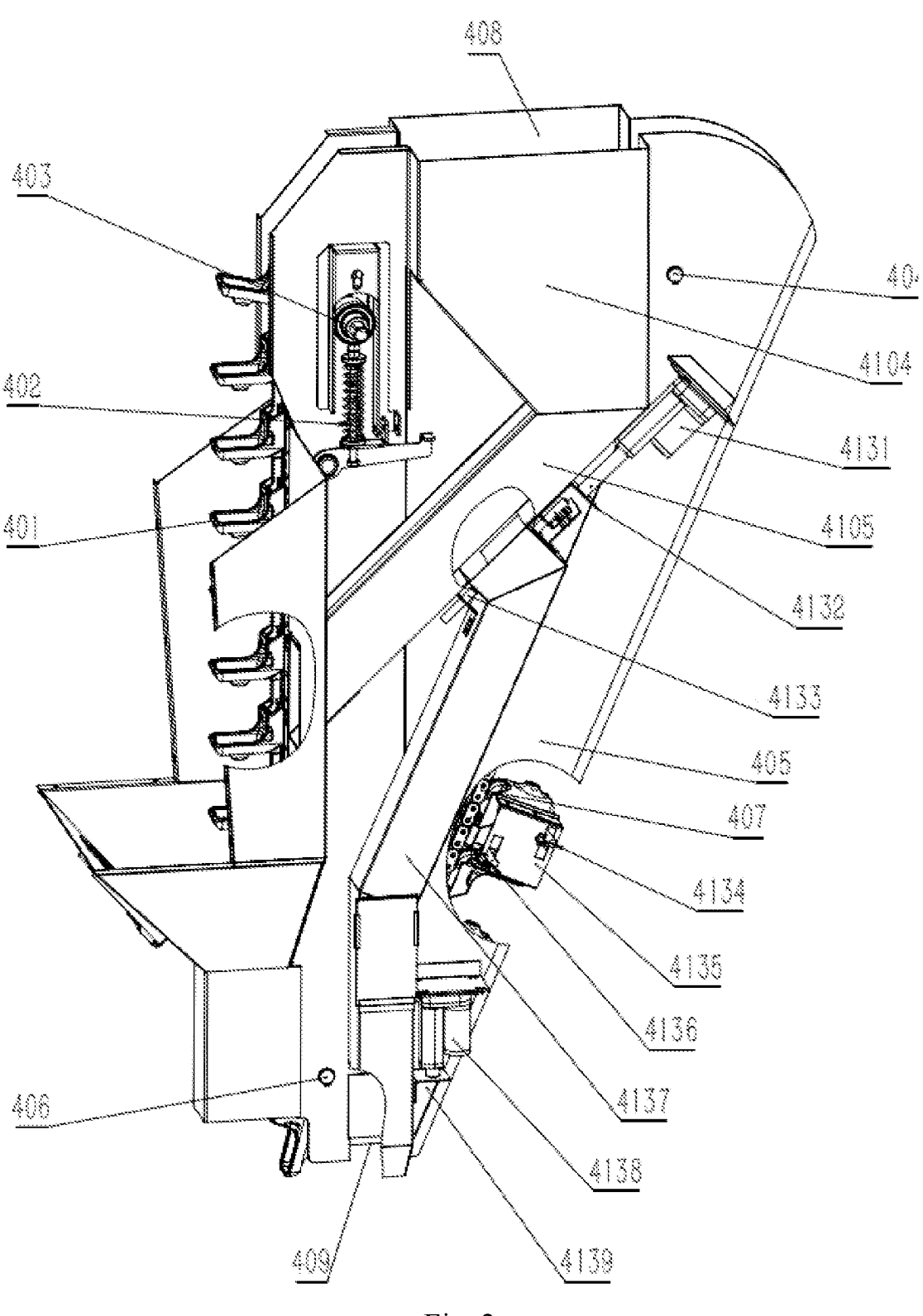
FIG. 2 is a schematic structural diagram of a seeding mechanism of the present invention.
Figure 3:
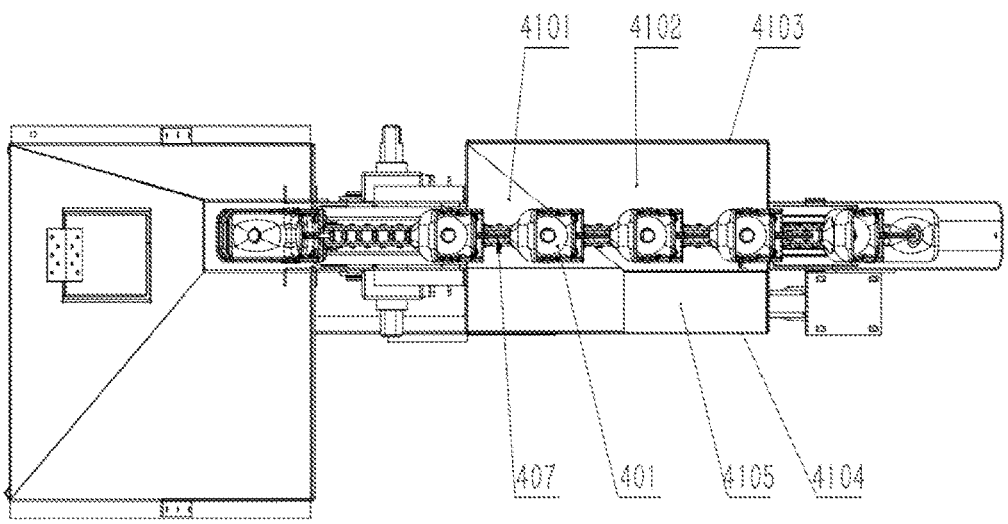
FIG. 3 is a schematic structural diagram of a top view of a seeding mechanism of the present invention.
Figure 4:
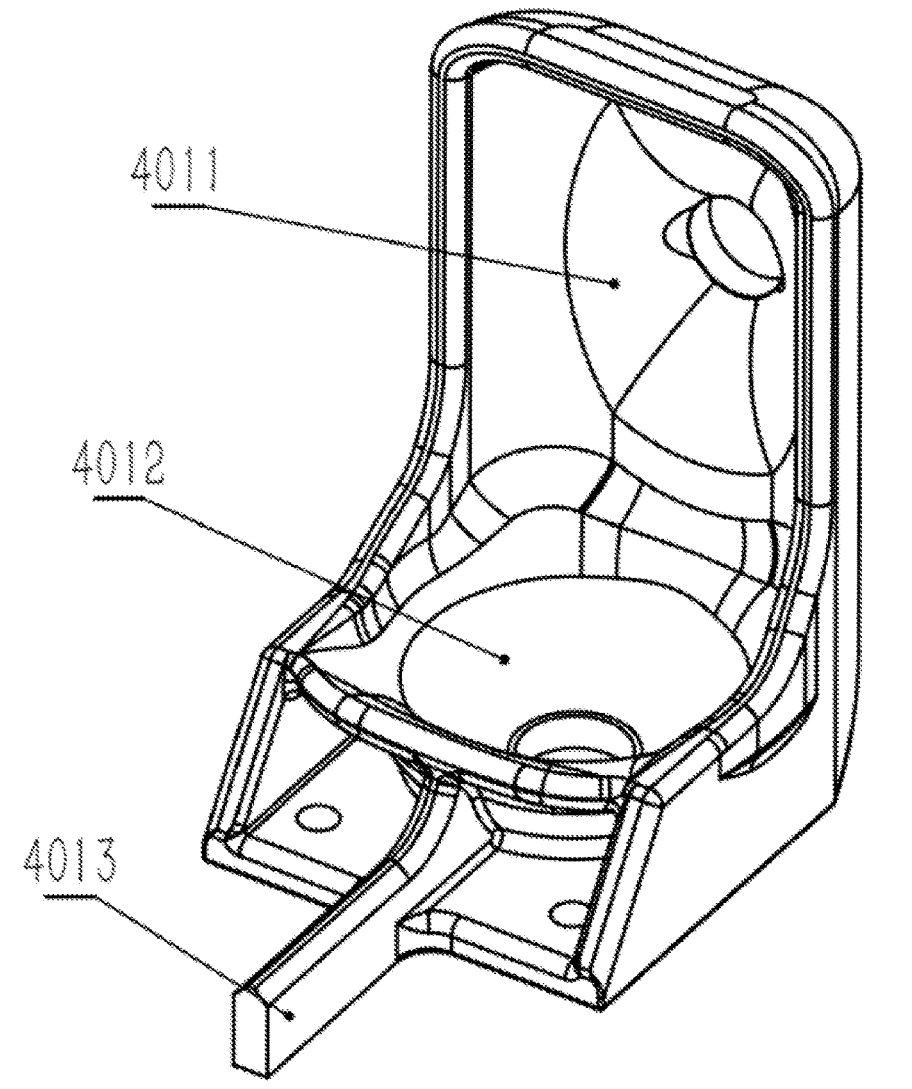
FIG. 4 is a schematic structural diagram of a seed-discharge spoon of the present invention.
Figure 5:
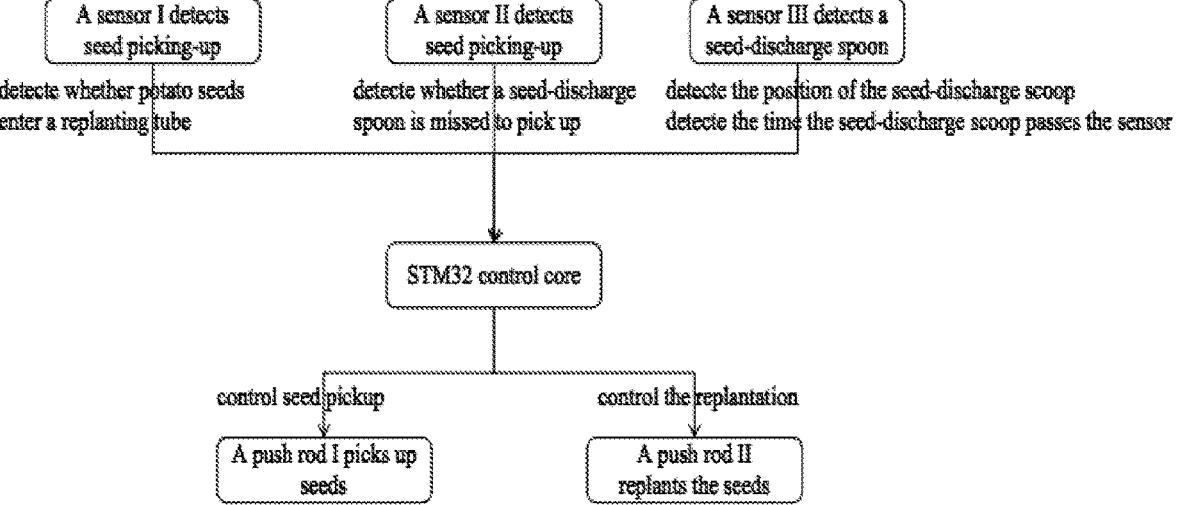
FIG. 5 is a schematic diagram of control of the present invention.

Referring to FIGS. 1-5, a planter suitable for block seeds includes a frame 1, a fertilizing tank 2, a fertilizing box 3, a seeding mechanism 4, a control mechanism 5, a seed box 6, a ridging mechanism 7, land wheels 8, a seeding furrower 9, a fertilizing furrower 10, a seed-clearing mechanism, and a replanting mechanism. The fertilizing tank 2, the fertilizing furrower 10, the fertilizing box 3, the seeding furrower 9, the seeding mechanism 4, the land wheels 8, the control mechanism 5, the seed box 6, and the ridging mechanism 7 are mounted in turn from one end to the other end of the frame. The fertilizing box 3 is located at the top of the fertilizing tank 2. The fertilizing furrower 10 is located below the fertilizing tank 2. The bottom end of the fertilizing tank 3 is opened and provided with a fertilizing outlet. The top end of the fertilizing tank 3 is opened and provided with a fertilizing inlet. The fertilizing outlet at the bottom end of the fertilizing tank 3 is aligned with the fertilizing inlet at the top end of the fertilizing tank 2, so that a fertilizer in the fertilizing box 3 can enter into the fertilizing tank 2 via the fertilizing outlet and the fertilizing inlet. The bottom end of the fertilizing tank 2 is opened and provided with the fertilizing outlet. The fertilizing outlet at the bottom end of the fertilizing tank 2 is located on the inner side of the fertilizing furrower 10. After a fertilizing furrow is opened by the fertilizing furrower 10, the fertilizer in the fertilizing box 3 enters the fertilizing furrow via the fertilizing outlet at the bottom end of the fertilizing tank 2.

The two seeding mechanisms 4 and the two seeding furrowers 9 are disclosed. The seeding furrower 9 is located at the bottom end of the seeding mechanism 4. After a seed furrow is opened by the seeding furrower 9, the seeds sown by the seeding mechanism 4 fall directly into the corresponding seed furrow.

The ridging mechanism 7 is located behind the seeding furrower 9. After the fertilizer is applied to the fertilizing furrow and the seed is sown to the seed furrow, the ridging mechanism mulches soil into the fertilizing furrow and the seed furrow and raises a ridge, seeds and the fertilizing are both buried into the ridge, which completes a process of seeding seeds on the ridge.

The planter also includes a transmission mechanism. The transmission mechanism is connected to the land wheels 8, the seeding mechanism 4, the fertilizing box 3, and the seed box 6, respectively, to realize power transmission and distribution.

The two groups of seed-clearing mechanisms and the two groups of replanting mechanism are disclosed, and provided one side of the corresponding seeding mechanism 4, respectively. The seed-clearing mechanism is communicated with the seeding mechanism 4 at the upper end. The seed-clearing mechanism is communicated with the seed box 6 at the lower end so that the excess seeds cleared off by the seed-clearing mechanism can be returned to the seed box 6. The middle of the seed-clearing mechanism is communicated with the upper end of the replanting mechanism. An outlet of the lower end of the replanting mechanism 4 is communicated with an outlet of the lower end of the seeding mechanism 4, which advantageous for the replanting mechanism to replant the seeds directly into the seed furrow where the seeds are missed.

The control mechanism 5 is located at one end of the seed box 6. The control mechanism 5 is connected to the replanting mechanism, specifically, through a wire connection or through a signal transmission connection. Therefore, the operation of the replanting mechanism is controlled through the control mechanism 5. The two land wheels 8 are disclosed. The two land wheels 8 are located on the two sides of the frame 1. During a seeding operation, the land wheels 8 provide the power for the seeding mechanism 4, the fertilizing box 3, and the seed box 6 via the transmission mechanism.

The seeding mechanism 4 includes a seed-discharge spoon 401, a tensioning assembly 402, a driving shaft 403, a first driven shaft 404, a housing 405, a second driven shaft 406, and a seed-discharge chain 407. The housing 405 is provided with the driving shaft 403, the first driven shaft 404, and the second driven shaft 406. The driving shaft 403 and the first driven shaft 404 are located on the left and right sides of the top of the housing 405. The housing 405 is provided with a seed-clearing zone 408 at the top. The seed-clearing area 408 contains a zone between the driving shaft 403 and the first driven shaft 404. Excess seeds are cleaned up in the seed-clearing zone 408. The second driven shaft 406 is located at the bottom end of the housing 405. The housing 405 is provided with a seeding port 409 at the bottom end. The seeding port 409 is a seeding outlet at the lower end of the seeding mechanism 4. The seeding port 409 is located below the second driven shaft 406 below and behind the seeding furrower 9.

A driving sprocket is mounted on the driving shaft 403. A first driven sprocket is mounted on the first driven shaft 404. A second driven sprocket is mounted on the second driven shaft 406. The driving sprocket, the first driven sprocket, and the second driven sprocket are connected to each other by a seed-discharge chain 407. Therefore, after the driving sprocket obtains power, the remaining two driven sprockets are driven to rotate by the seed-discharge chain 407.

The seed-discharge chain 407 between the driving sprocket and the second driven sprocket is inclined to the right, with an angle of inclination relative to a vertical direction of 0°-10°, preferably 5° (referred to as upper and lower segments). The seed-discharge chain 407 between the driving sprocket and the first driven sprocket passes through the seed-clearing zone 408, and is in the form of an inclined shape of the high left and the low right, with an angle of inclination of 0-10°, preferably 5° (referred to as left and right segments). The left and right segments of the seed-discharge chain 407 are moved and arranged, which is favorable for the seeds to be cleaned up. An angle between the upper and lower segments and the left and right segments of the seed-discharge chain 407 is 90°-95°, preferably 90°.

The two tensioning assemblies 402 are disclosed and provided at the two sides of the housing 405, respectively. The movable end of the tensioning assembly 402 is fixedly connected to the driving shaft 403. A spring is provided in the tensioning assembly 402. A pretightening force of the spring is adjusted to change the positions of the driving shaft 403 and the driving sprocket, so that the seed-discharge chain 407 is tensioned.

Seed-discharge spoons 401 are arranged uniformly at the outer side of the seed-discharge chain 407. Seeds are taken in the seed box 6 by the seed-discharge spoon 401. The seed-discharge spoon 401 is L-shaped. The inner part of the top end of the seed-discharge spoon 401 is opened and provided with a seed-picking groove 4011. The inner part of the bottom end of the seed-discharge spoon 401 is opened and provided with a base groove 4012. The seed-picking groove 4011 has an internal volume bigger than that of the base groove 4012. An angle between the seed-picking groove 4011 and the base groove 4012 is 90°-95°, preferably 90°. A seed-clearing crossbeam 4013 is fixed at one end of the base groove 4012. Falling seeds are prevented from catching on the seed-discharge chain 407 via the seed-clearing crossbeam 4013 during the seeds are cleared, which contributes to the reduction of reseeding. The bottom of the base groove 4012 and the bottom of the seed-picking groove are provided with through holes, so that powder, mud, sand and other pollutants on the surfaces of the seeds can pass through the through hole and fall and cannot be accumulated, which help clearance. One end of the base groove 4012 is opened and provided with a connecting hole at one end. A bolt is provided inside the connecting hole. The seed-discharge spoon 401 and the seed-discharge chain 407 are cooperatively connected to each other via the bolt and the connecting hole. After installation, the seed-clearing crossbeam 4013 is aligned with the seed-discharge chain 407, and is located above the seed-discharge chain 407.

The seed-clearing mechanism includes a first seed-clearing plate 4101, a second seed-clearing plate 4102, a first side plate 4103, a second side plate 4104, and a seed-return tube 4105. The second seed-clearing plate 4102 is fixed at one end of the first seed-clearing plate 4101. The first seed-clearing plate 4101 is obliquely connected to the second seed-clearing plate 4102. The second side plate 4104 is fixed at the other end of the first seed-clearing plate 4101. The first side plate is fixed at the top of the second seed-clearing plate 4102. The first seed-clearing plate 4101, the second seed-clearing plate 4102, the first side plate 4103, and the second side plate 4104 are connected to each other to form a funnel with a large top and a small bottom. The second seed-clearing plate 4102 is fixed to the housing 405, The top of the funnel is located inside the seed-clearing zone 408. The funnel is connected to the seed-return tube 4105 at the bottom end. The seed-return tube 4105 is communicated with the seed box 6 at the bottom end. Seeds cleared in the seed-clearing zone 408 fall into the funnel and return to the seed box via the seed-return tube 4105. The seed-return tube 4105 is provided with a replanting outlet. The seed-return tube 4105 is fixedly connected to the housing 405. The cross-section of the seed-return tube 4105 is a tubular structure.

The replanting mechanism includes a first push rod 4131, a push plate 4132, a first sensor 4133, a second sensor 4134, a sensor mounting plate 4135, a third sensor 4136, a replanting tube 4137, a second push rod 4138, and a baffle plate 4139. The replanting tube 4137 is a multi-segmented curved tube. The cross-section of the replanting tube 4137 is a tubular structure. The replanting tube 4137 is fixed to the housing 405. The replanting tube 4137 is connected to the replanting outlet of the seed-return tube 4105 at the top end. The seeds in the seed-return tube 4105 fall into the replanting tube 4137 when passes through the replanting outlet. An outlet at the bottom end of the replanting tube 4137 is communicated with a seeding port 409. The outlet at the bottom end of the replanting tube 4137 is tilted towards the seeding port 409 to facilitate replanted seeds to be slid down into the seed furrow.

A first connecting bracket is fixed at one side of the housing 405. The first push rod 4131 is fixed at the first connecting bracket, the push plate 4132 is fixed at a push rod of the first push rod 4131. The push plate 4132 is L-shaped. One end of the push plate 4132 runs through the replanting tube 4137, and is slidingly connected to the replanting outlet of the seed-return tube 4105, so that the push plate 4132 may be moved in an expansion and contraction direction of the first push rod 4131, and can open or close the replanting outlet of the seed-return tube 4105. A second connecting bracket is fixed on one side of the housing 405. The second connecting bracket is located above the seeding port 409. The second push rod 4138 is fixed on the second connecting bracket. The baffle plate 4139 is fixed at the push rod of the second push rod 4138. One end of the baffle plate 4139 is located in a gap between the outlet at the bottom end of the replanting tube 4137 and the housing 405. The second push rod 4138 drives the baffle plate 4139 to rise and fall when the second push rod 4138 extends and retracts, so that the outlet at the bottom end of the replanting tube 4137 and the seeding port 409 are communicated with each other or closed.

The two sides of the top end of the replanting tube 4137 are opened and provided with a first mounting hole. The first sensor 4133 is fixed in the interior of the first mounting hole and configured to detect whether there are seeds entering the replanting tube 4137 via the replanting outlet of the seed-return tube 4105. The sensor mounting plate 4135 is fixed at the two sided of the housing 405. A second mounting hole is provided in the interior of the sensor mounting plate 4135. The position of the housing 405 corresponding to the second mounting hole is opened and provided with detecting hole. The two second mounting holes the second sensor 4134 and the third sensor 4136 are mounted in the interiors of the two second mounting holes. Seed potatoes are provided at the upper position of the second sensor 4134 aligned with the seed-discharge spoon 401. The second sensor 4134 is configured to detect whether a seed-picking spoon 401 misses the seeds. The third sensor 4136 is aligned with the bottom of the seed-discharge spoon 401 for detecting the time at which the seed-picking spoon 401 passes through a detection position.

Preferably, the first sensor 4133, the second sensor 4134, and the third sensor 4136 are all photoelectric sensors of an active infrared intrusion detector.

The control mechanism 5 includes a microcontroller, a step-down module, an opto-coupler converter, and a driver module.

The external power supply is connected to the step-down module, the driver module, and the opto-coupler converter.

The step-down module is configured to adjust the voltage of an external power supply to supply power to the microcontroller.

The opto-coupler converter converts signals detected by the first sensor 4133, the second sensor 4134, and the third sensor 4136 into signals acceptable to the microcontroller.

The microcontroller is connected to the driver module to transfer a control signal to the driver module. The model of the microcontroller is STM32F114CE.

The driver module has two connecting ports connected to the first push rod 4131 and the second push rod 4138, respectively, and is configured to drive the first push rod 4131 and the second push rod 4138 to perform the corresponding actions so that the control mechanism 5 controls two groups of replanting mechanisms at the same time.

In Summary:

With the technical solutions of the above embodiments, the present invention addresses the following technical problems: an existing planting machine is prone to reseeding and missing seeds when in use, while the effects of seed-clearing and replanting are poor. Meanwhile, the process of realizing the above technical solution is as follows:

Before operation, a three-point suspension at the front end of the frame 1 is connected to a tractor, a rear power output shaft of the tractor is connected to a power input shaft of the planting machine using a universal joint, processed cut seed potatoes are poured into the seed box 6. A fertilizer is poured into the fertilizing box 3. The depth positions of the seeding furrower 9 and the fertilizing furrower 10 are adjusted.

During the operation, the tractor is started. A power supply of the control mechanism 5 turns on. The tractor traction pulls the planting machine forward. The fertilizing furrower 10 and the seeding furrower 9 open the fertilizing furrow and the seed furrow, the land wheels 8 rotate to input power to the transmission mechanism. The transmission mechanism provides power to the seeding mechanism 4, the fertilizing box 3, and the seed box 6. The fertilizing box 3 discharges the fertilizer to the fertilizing tank 2. The fertilizer slides down the fertilizing groove 2 and reaches the fertilizing furrow opened by the fertilizing furrower 10. The seed box 6 is provided with a vibration mechanism at the outer side so that the seeds in the seed box 6 vibrate, which is conducive to the discharge of the seeds by the seeding mechanism 4. The seed-discharge chain 407 of the seeding mechanism 4 drives the seed-discharge spoon 401 to take out the block seeds from the seed box 6 and convey the block seeds. The excess block seeds are cleared when the seed-discharge spoon 401 moves to the seed-clearing zone 408. The seed-discharge spoon 401 continues to convey the block seeds after the seeds are cleared. The replanting mechanism detects the seed-discharge spoon 401 and a missing planting case of the seed-discharge spoon 401. If there is no missing planting, the replanting mechanism does not perform any action, if there is the missing planting, when the seed-discharge spoon 401 moves to the seeding port 409, the replanting mechanism opens the outlet at the bottom end of the replanting tube 4137. The block seeds fall into the seed furrow opened by the seeding furrower 9. The rear power output shaft of the tractor provides power for the ridging of the ridging mechanism 7, drives the ridging mechanism 7 to rotate, ridges in a fertilizing seeding zone, and buries the fertilizer and the seed potatoes in the ridging, to complete the seeding process.

Seed clearing-seeding working principle: The driving shaft 403 rotates to drive the seed-discharge chain 407 to drive the seed-discharge spoon 401 to move clockwise. When the seed-discharge spoon 401 passes the seed box 6, the block seeds fall into the seed-picking groove 4011. Due to a large volume, the seed-discharge spoon 401 obtains at least one or more seeds. The seed-discharge spoon 401 carries the block seeds to continue to move to the driving shaft 403. The seed-discharge spoon 401 is gradually turned over with the driving shaft 403 as a rotary center. The seeds roll with the turning of the seed-discharge spoon 401. The seeds roll from the seed-picking groove 4011 to the base groove 4012. The base groove 4012 can hold at least one seed. The excess seeds falls from the seed-discharge spoon 401. The seed-discharge spoon 401 is located in the seed-clearing zone 408 after being turned over. The excess seeds fall into the funnel of the seed-clearing mechanism, and falls into the seed-return tube 4105 under the action of gravity, and then return back to the seed box 6. Because the seed-clearing crossbeam 4013 is located above the seed-discharge chain 407, the block seeds cleared out collide with the seed-clearing crossbeam 4013, may not be stuck between the front and rear seed-discharge spoons 401, and may not be stagnant in the seed-discharge chain 407, so that the block seeds are easier to fall. After the seeds are cleared, the seed-discharge spoon 401 carries the block seeds to continue to move in the housing 405. When the seed-discharge spoon 401 moves to the seeding port 409, the block seeds fall down to complete the seeding.

Replanting—seeding working principle: Before the operation, the control mechanism 5 and the replanting mechanism are initialized. The first push rod 4131 and the second push rod 4138 conduct an empty execution once to verify the functionality of the push rod. In addition, the potato seeds remaining in the replanting tube 4137 are emptied. The first push rod 4131 contracts to drive the push plate 4132 to be retracted. The replanting outlet of the seed-return tube 4105 is opened. In addition, the second push rod 4138 extends out to drive the baffle plate 4139 to move downwards. The outlet at the bottom end of the replanting tube 4137 is closed to complete a replanting initialization process. During the operation, the driving shaft 403 rotates to drive the seed-discharge chain 407 to carry the seed-discharge spoon 401 in a clockwise movement. The seed-discharge spoon 401 completes a seed-picking process when passing through the seed box 6. The seed-discharge spoon 401 completes a seed-clearing process when carrying the block seeds to pass through the seed-clearing zone 408. It may be possible to have missing seeds when the seed-discharge spoon 401 picks and clears the seeds, i.e., a situation in which there is no seed on the seed-discharge spoon 401. When the excess seeds in the seed-clearing process passes through the replanting outlet of the seed-return tube 4105, some seeds fall into the replanting tube 4137. When the first sensor 4133 detects that there is a seed masking a signal, it is indicated that there is the potato seed entering the replanting tube 4137. The first push rod 4131 extends out and drives the push plate 4132 to extend out and close the replanting outlet of the seed-return tube 4105 to completes a seed storage process. When the seed-discharge spoon 401 passes through the second sensor 4134 and the third sensor 4136, the third sensor 4136 detects the position of the seed-discharge spoon 401. The second sensor 4134 detects whether there is the seed above the seed-discharge spoon 401 at this time. If the signal of the second sensor 4134 is blocked, it is indicated that there is the seed. Then, the seeding mechanism normally seed. Otherwise, there is no seed, and there is need to replant. In addition, the control mechanism 5 deals with the time used by the seed-discharge spoon passing through the third sensor 4136, calculates in real time and update the movement speed of the seed-discharge chain 407 or the seed-discharge spoon 401. According to the movement speed of the seed-discharge chain 407 or the seed-discharge spoon 401, the delay time of replanting is calculated. After a certain delay time, the seed-discharge spoon 401 of the missing seeds moves to the seeding port 409. The second push rod 4138 drives the baffle plate 4139 so that the outlet at the bottom of the replanting tube 4137 is opened. The seeds at the bottom of the replanting tube 4137 slide to the seeding port 409 and fall directly into the seed furrow, thereby completing the replanting process. Then, the second push rod 4138 pushes the baffle plate 4139 so that the baffle plate 4139 closes an outlet at the lower end of the replanting tube 4137. The first push rod 4131 moves to pull the push plate 4132 open to open the replanting outlet of the seed-return tube 4105, thereby entering a next seed storage-replanting process.

With the above settings, the present application is bound to solve the above technical problems and, at the same time, realize the following technical effects:

A seed-discharge spoon structure with a big tank and a small tank is adopted. The movement arrangement of the right and left section of a seed-discharge chain is combined. Self-clearing technology during a seed-discharge process of block seed potatoes is realized. A photoelectric sensor of an active infrared intrusion detector is adopted to dynamically monitor the presence of the seed potatoes on a seed-discharge spoon in a conveying process. Seeds are replanted with the control mechanism when the seeds are sowed with an empty spoon. The seeds are replanted in a seed furrow in a timely manner to avoid missing replantation, blocking and other replanting failures. The excess seed potatoes generated during a seed-clearing process are utilized to replant the seeds, which solves the problems of re-seeding and missing seeds of the block seeds. The replanting box does not need to be separately provided. The excess seed potatoes are automatically returned to the seed box. The planter has the advantages of the integration of detection, storing seeds and replantation, a simple structure, and small space occupation, and solves the problem of reseeding and missing seeds of the block seeds.

The forgoing show and describe the basic principles, main features and advantages of the present invention. The person skilled in the art should understand that the present invention is not limited by the forgoing embodiments. The forgoing embodiments and the specification only illustrate the principles of the present invention. Without departing from the spirit and scope of the present invention, the present invention has various changes and improvements, and these changes and improvements fall within the scope of the claimed present invention. The scope of protection claimed by the present invention is defined by the appended claims and the equivalents thereof.

What is claimed is:

1. A planter suitable for block seeds, comprising a frame (1), a fertilizing tank (2), a fertilizing box (3), two seeding mechanisms (4), a control mechanism (5), a seed box (6), a ridging mechanism (7), two land wheels (8), two seeding furrowers (9), a fertilizing furrower (10), two seed-clearing mechanisms, and two replanting mechanisms, wherein the fertilizing furrower (10), the fertilizing tank (2), the fertilizing box (3), the two seeding furrowers (9), the two land wheels (8), the two seeding mechanisms (4), the control mechanism (5), the seed box (6) and the ridging mechanism (7) are mounted in turn from one end to an opposite end of the frame, the fertilizing box (3) is located at a top of the fertilizing tank (2), the fertilizing furrower (10) is located below the fertilizing tank (2), the two seeding furrowers (9) are located below the two seeding mechanisms (4), the seed box (6) is located behind the seeding mechanism (4), and the ridging mechanism (7) is located behind the seeding furrower (9);

each of the two seed-clearing mechanisms and each of the two replanting mechanisms are provided on one side of a corresponding one of the two seeding mechanisms (4), each of the two seed-clearing mechanisms has an upper end with which a corresponding one of the two seeding mechanisms (4) communicates, each of the two seed-clearing mechanisms has an lower end that communicates with the seed box (6), a middle of each of the two seed-clearing mechanisms communicates with an upper end of a corresponding one of the two replanting mechanisms, an outlet of a lower end of each of the two replanting mechanisms communicates with an outlet of a lower end of a corresponding one of the two seeding mechanisms (4);

the control mechanism (5) is located at one end of the seed box (6), the control mechanism (5) is connected to the two replanting mechanisms, and the two land wheels (8) are located on each of two opposite sides of the frame (1), respectively.

2. The planter suitable for the block seeds according to claim 1, wherein a bottom end of the fertilizing tank (3) is open and provided with a fertilizing outlet, and a top end of the fertilizing box (2) is open and provided with a fertilizing inlet, the fertilizing outlet at the bottom end of the fertilizing tank (3) is aligned with the fertilizing inlet at the top end of the fertilizing box (2).

3. The planter suitable for the block seeds according to claim 1, wherein the seeding mechanism (4) comprises a seed-discharge spoon (401), a tensioning assembly (402), a driving shaft (403), a first driven shaft (404), a housing (405), a second driven shaft (406), and a seed-discharge chain (407);

the housing (405) is provided thereon with the driving shaft (403), the first driven shaft (404), and the second driven shaft (406), the driving shaft (403) and the first driven shaft (404) are located at first and second sides of a top of the housing (405), a driving sprocket is mounted on the driving shaft (403), and a first driven sprocket is mounted on the first driven shaft (404);

the second driven shaft (406) is located at a bottom end of the housing (405), a second driven sprocket is mounted on the second driven shaft (406), the driving sprocket, the first driven sprocket, and the second driven sprocket are connected to each other via the seed-discharge chain (407);

the two tensioning assemblies (402) are provided on two sides of the housing (405), respectively, a movable end of the tensioning assembly (402) is fixedly connected to the driving shaft (403), and seed-discharge spoons are mounted uniformly on an outer side of the seed-discharge chain.

4. The planter suitable for the block seeds according to claim 3, wherein the housing (405) is provided with a seed-clearing zone (408) at a top end, and the seed-clearing zone (408) comprises a zone between the driving shaft (403) and the first driven shaft (404).

5. The planter suitable for the block seeds according to claim 3, wherein the housing (405) is provided with a seeding port at the bottom end of the housing (405), and the seeding port (409) is located below the second driven shaft (406) and behind a corresponding one of the two the seeding furrowers (9).

6. The planter suitable for the block seeds according to claim 3, wherein an inner part of a top end of the seed-discharge spoon (401) is open and provided with a seed-picking groove (4011), the seed-picking groove (4011) has an internal volume larger than that of a base groove (4012), a seed-clearing crossbeam (4013) is fixed at one end of the base groove (4012), each of a bottom of the base groove (4012) and a bottom of the seed-picking groove (4011) are provided with through holes, one end of the base groove (4012) is open and provided with a connecting hole, an inner part of the connecting hole is provided with a bolt, and the seed-discharge spoon (401) is cooperatively connected to the seed-discharge chain (407) via the bolt and the connecting hole.

7. The planter suitable for the block seeds according to claim 1, wherein each of the two seed-clearing mechanisms comprises a first seed-clearing plate (4101), a second seed-clearing plate (4102), a first side plate (4103), a second side plate (4104), and a seed-return tube (4105), the second seed-clearing plate (4102) is fixed at one end of the first seed-clearing plate (4101), the first seed-clearing plate (4101) is obliquely connected to the second seed-clearing plate (4102), the second side plate (4104) is fixed at another end of the first seed-clearing plate (4101), the first side plate (4103) is fixed at a top of the second seed-clearing plate (4102), the first seed-clearing plate (4101), the second seed-clearing plate (4102), the first side plate (4103), and the second side plate (4104) are connected to each other to form a funnel with a top and a small bottom, the second seed-clearing plate (4102) is fixed to the housing (405), the top of the funnel is located in an inner part of the seed-clearing zone (408), the bottom of the funnel is connected to the seed-return tube (4105), a bottom end of the seed-return tube (4105) communicates with the seed box (6), and the seed-return tube (4105) has a middle with a lower side provided with a replanting outlet.

8. The planter suitable for the block seeds according to claim 3, wherein each of the two replanting mechanisms comprises a first push rod (4131), a push plate (4132), a first sensor (4133), a second sensor (4134), a sensor mounting plate (4135), a third sensor (4136), a replanting tube (4137), a second push rod (4138) and a baffle plate (4139), and the replanting tube (4137) is fixed to the housing (405).

9. The planter suitable for the block seeds according to claim 8, wherein a first connecting bracket is fixed on one of the two sides of the housing (405), the first push rod (4131) is fixed on the first connecting bracket, the push plate (4132) is fixed to the first push rod (4131), one end of the push plate (4132) runs through the replanting tube (4137) and is slidingly connected to the replanting outlet of the seed-return tube (4105), the second connecting bracket is fixed on one side of the housing (405), the second push rod (4138) is fixed on the second connecting bracket, a baffle plate (4139) is fixed to the second push rod (4138), and the baffle plate is located between an outlet at a bottom end of the replanting tube (4137) and the housing (405).

10. The planter suitable for the block seeds according to claim 9, wherein the control mechanism (5) comprises a microcontroller, a step-down module, an opto-coupler converter, and a driver module;

the step-down module is configured to adjust the voltage of an external power supply to supply power to the microcontroller;

the opto-coupler converter converts signals detected by the first sensor (4133), the second sensor (4134), and the third sensor (4136) into signals acceptable to the microcontroller;

the microcontroller is connected to the driver module and transmits control signals to the driver module;

the driver module is connected to and controls a seed-storage first push rod (4131) and the second push rod (4138) respectively to perform corresponding actions.

11. The planter suitable for the block seeds according to claim 2, wherein the bottom end of the fertilizing tank (2) is provided with a discharge outlet, and the discharge outlet at the bottom end of the fertilizing tank (2) is located at an inner side of the fertilizing furrower (10).

12. The planter suitable for the block seeds according to claim 7, wherein each of the two replanting mechanisms comprises a first push rod (4131), a push plate (4132), a first sensor (4133), a second sensor (4134), a sensor mounting plate (4135), a third sensor (4136), a replanting tube (4137), a second push rod (4138) and a baffle plate (4139), the replanting tube (4137) is fixed to the housing (405), and a top end of the replanting tube (4137) communicates with the replanting outlet of the seed-return tube (4105).

13. The planter suitable for the block seeds according to claim 9, wherein a top of the replanting tube (4137) has two open sides and is provided with a first mounting hole, the first sensor (4133) is fixed inside the first mounting hole, a sensor mounting plate (4135) is fixed on the housing (405), a second mounting plate (4135) is provided therein with a sensor mounting hole, a position of the housing (405) corresponding to each of two second mounting holes is open, and the second sensor (4134) and the third sensor (4136) are mounted inside the two second mounting holes, respectively.

\* \* \* \* \*